United States Patent
Wu

(10) Patent No.: US 7,505,255 B2
(45) Date of Patent: Mar. 17, 2009

(54) KVM MODULE WITH TORSION-VARYING HINGE

(75) Inventor: Sui-An Wu, Taipei Hsien (TW)

(73) Assignee: ATEN International Co. Ltd., Shijr (TW)

( * ) Notice: Subject to any disclaimer, the term of this patent is extended or adjusted under 35 U.S.C. 154(b) by 384 days.

(21) Appl. No.: 11/391,543

(22) Filed: Mar. 29, 2006

(65) Prior Publication Data

US 2007/0230095 A1 Oct. 4, 2007

(51) Int. Cl.
*G06F 1/16* (2006.01)
*H05K 5/00* (2006.01)
*H05K 7/00* (2006.01)

(52) U.S. Cl. .................................... 361/681
(58) Field of Classification Search .................. 361/681, 361/680, 683–686
See application file for complete search history.

(56) References Cited

U.S. PATENT DOCUMENTS 5,796,578 A * 8/1998 Jones .......................... 361/683
5,910,883 A * 6/1999 Cipolla et al. ............... 361/687

FOREIGN PATENT DOCUMENTS

| CN | 2572117 Y | 9/2003 |
|---|---|---|
| CN | 2573750 Y | 9/2003 |
| CN | 2708363 Y | 7/2005 |
| CN | 1517871 A | 8/2008 |
| TW | 246978 U | 10/2004 |
| TW | 288084 U | 2/2006 |

* cited by examiner

*Primary Examiner*—Javaid Nasri
(74) *Attorney, Agent, or Firm*—Patterson & Sheridan

(57) ABSTRACT

A console KVM module includes a main base, a flat panel display module and a torsion-varying hinge. A torsion-varying hinge links the flat panel display module with the main base such that the flat panel display module can fold against or unfold away from the main base. The torsion-varying hinge mainly comprises a fixed part, a swiveled part, a shaft and a torsion part. The fixed part is secured to the main base. The swiveled part is secured to the flat panel display module. The swiveled part is pivotally connected with the fixed part by the shaft. A torsion part is disposed around the shaft and engaged in the fixed part and the swiveled part at two ends, wherein the torsion part provides an assisting torsion while folding and unfolding the flat panel display module.

9 Claims, 3 Drawing Sheets

KVM MODULE WITH TORSION-VARYING HINGE

BACKGROUND

1. Field of Invention

The present invention generally relates to a KVM (keyboard, Video, and Mouse) module. More particularly, this invention relates to a KVM module with a torsion-varying hinge.

2. Description of Related Art

KVM switches are widely used to monitor and control computer servers more effectively. In combination with a KVM switch, it is possible to manage multiple computers with only one set of keyboard, video monitor and mouse, which saves both space and cost. A KVM switch may also be integrated with a flat panel display, a keyboard and a cursor control device to form a so-called LCD KVM module or a console module.

The flat panel display of a conventional console KVM module is pivotally connected with its main base by a hinge. Thus, the flat panel display can be swiveled to fold against or unfold away its main base so as to save storage space and be convenient for user operation. The hinge also provides enough torsion to temporarily secure the flat panel display when it is swiveled to any position. Without such torsion, gravity would cause the flat panel display to rapidly swivel down against its main base when the user does not apply enough force to hold it, and thus may cause damages of the console KVM module or possible injuries to the users.

However, the larger size the flat panel display increases, the heavier it becomes, and consequently, the hinge is designed to provide larger torsion so as to support the larger and heavier flat panel display. According to the conventional technique, the torsion provided by the hinge is constant. However, the gravitational effect on the flat panel display may change according to its position, i.e., different torque at different angle and causes different gravitational pull. As a result, users have to apply more energy to swivel the flat panel display due to the excess torsion provided by the hinge while there is not need for such torsion at certain position. This makes it more difficult for a person to manipulate the console module or the console KVM module.

For the foregoing reasons, there is a need to redesigning the hinge for a console KVM module.

SUMMARY

It is therefore an objective of the present invention to provide a console KVM module with a torsion-varying hinge, which provides an assisting torsion while folding and unfolding the flat panel display module, and meanwhile is still capable of temporarily securing the flat panel display when it is swiveled to any position.

In accordance with the foregoing and other objectives of the present invention, the console KVM module includes a main base, a flat panel display module and a hinge. The hinge links the flat panel display module with the main base such that the flat panel display module can be folded against or unfolded away from the main base. The hinge mainly comprises a fixed part, a swiveled part, a shaft and a torsion part. The fixed part is secured to the main base. The swiveled part is secured to the flat panel display module. The swiveled part is pivotally connected with the fixed part by the shaft. The torsion part is disposed around the shaft, and engages in the fixed part and the swiveled part at two ends, wherein the torsion part provides an assisting torsion while folding and unfolding the flat panel display module.

Thus, a torsion-varying hinge provides a console KVM module with an assisting torsion while folding and unfolding the flat panel display. Therefore, a smaller force is required to fold or unfold the flat panel display and thus avoids any possible injury to the user and protects the console KVM module from being damaged.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
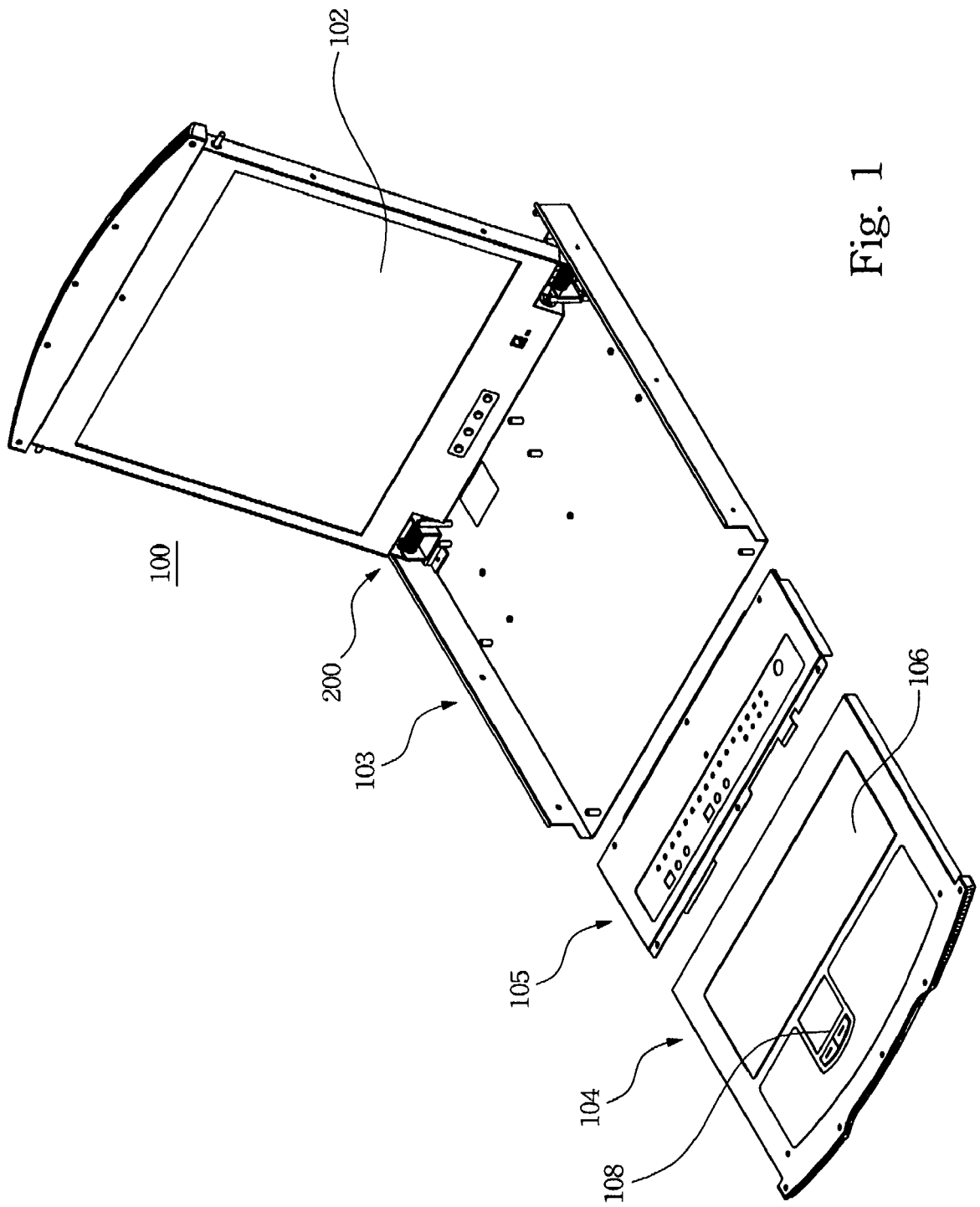
FIG. 1 illustrates an exploded view of an LCD KVM module with a torsion-varying hinge according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates an exploded view of an LCD KVM module with a torsion-varying hinge according to one preferred embodiment of this invention. An LCD KVM module 100 includes a flat panel display module 102 and a main base 103. The flat panel display module 102 is pivotally connected with the main base 103 by a hinge 200 such that the flat panel display module 102 can be swiveled to fold against or unfold away from the main base 103. A keyboard module 104 and a control board module 105 are installed on top of the main base 103. The keyboard module 104 includes a cursor control device 108 and keyboard 106 to control a device, i.e., a computer.

The hinge 200 provides an assisting torsion while unfolding the flat panel display module 102 away from the keyboard module 104 and while folding the flat panel display module 102 against the keyboard module 104, and meanwhile is still capable of temporarily securing the flat panel display when it is swiveled to any position. Therefore, users can fold or unfold the flat panel display module 102 easily and smoothly with the aid of the assisting torsion canceling part of the gravitational pull. The assisting torsion reduces the necessary torsion for temporarily securing the flat panel display module 102 while swiveling at any position.

Figure 2:
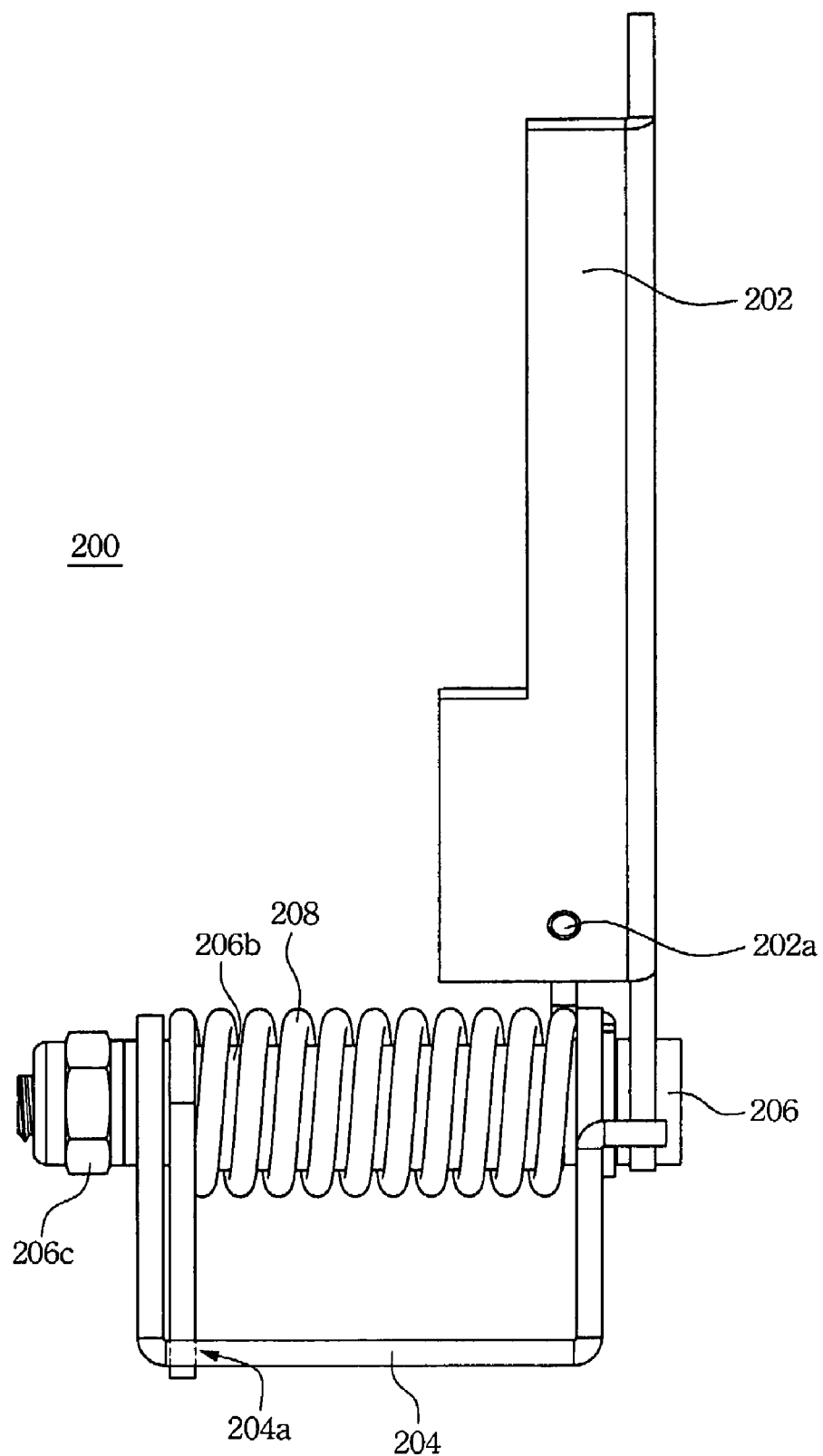
FIG. 2 illustrates a torsion-varying hinge according to one preferred embodiment of this invention.

FIG. 2 illustrates a torsion-varying hinge according to one preferred embodiment of this invention. The hinge 200 mainly includes a swiveled part 202, a fixed part 204, a torsion part 208 and a shaft 206. The swiveled part 202 is secured to the flat panel display module 102 (illustrated in FIG. 1). The fixed part 204 can be a U-shaped metal, which is secured to the main base 103. The torsion part 208 can be one (or more than one) torsion spring, which is disposed around the shaft 206 and is engaged in the fixed part 204 and the swiveled part 202 at two ends (each inserted into a hole 202a of the swiveled part 202 and a hole 204a of the fixed part 204). The shaft 206 can be a bolt, which is led through the fixed part 204, the swiveled part 202 and the torsion part 208, and a nut 206c is then screwed on the bolt so as to adjust the necessary torsion of the hinge 200 for temporarily securing the flat panel display module 102 while swiveling at any position. The torsion part 208 is accommodated by a concave portion of the U-shaped fixed part 204. Please note that in this embodiment, the assisting torsion provided by torsion spring may vary according to the angle between the fixed part 204 and the swiveled part 202, that is, according to the deformation of the torsion spring. People with ordinary skills in the art may implement the torsion part 208 with various kinds of mechanisms and adjust the assisting torsion to meet their needs.

When the swiveled part 202 is swiveled (or the flat panel display module 102 is swiveled), the torsion part 208 would apply an assisting torsion to the swiveled part 202. When the user applies a force to unfold the flat panel display module 102, the assisting torsion applied by the pre-deformed torsion part 208 would be a force opposing the gravitational pull, and thus the user is able to apply a smaller force to unfold the flat panel display module 102. When the user folds the flat panel display module 102, the assisting torsion applied by the pre-deformed torsion part 208 would be a force canceling at least part of the gravitational pull, and thus the user is able to smoothly fold the flat panel display module without damaging the console KVM module. Such assisting torsion applied by the pre-deformed torsion part 208 is against the effect of gravity on the flat panel display module 102, and thereby reduces the necessary torsion for temporarily securing the flat panel display module 102 while swiveling at any position.

Figure 3:
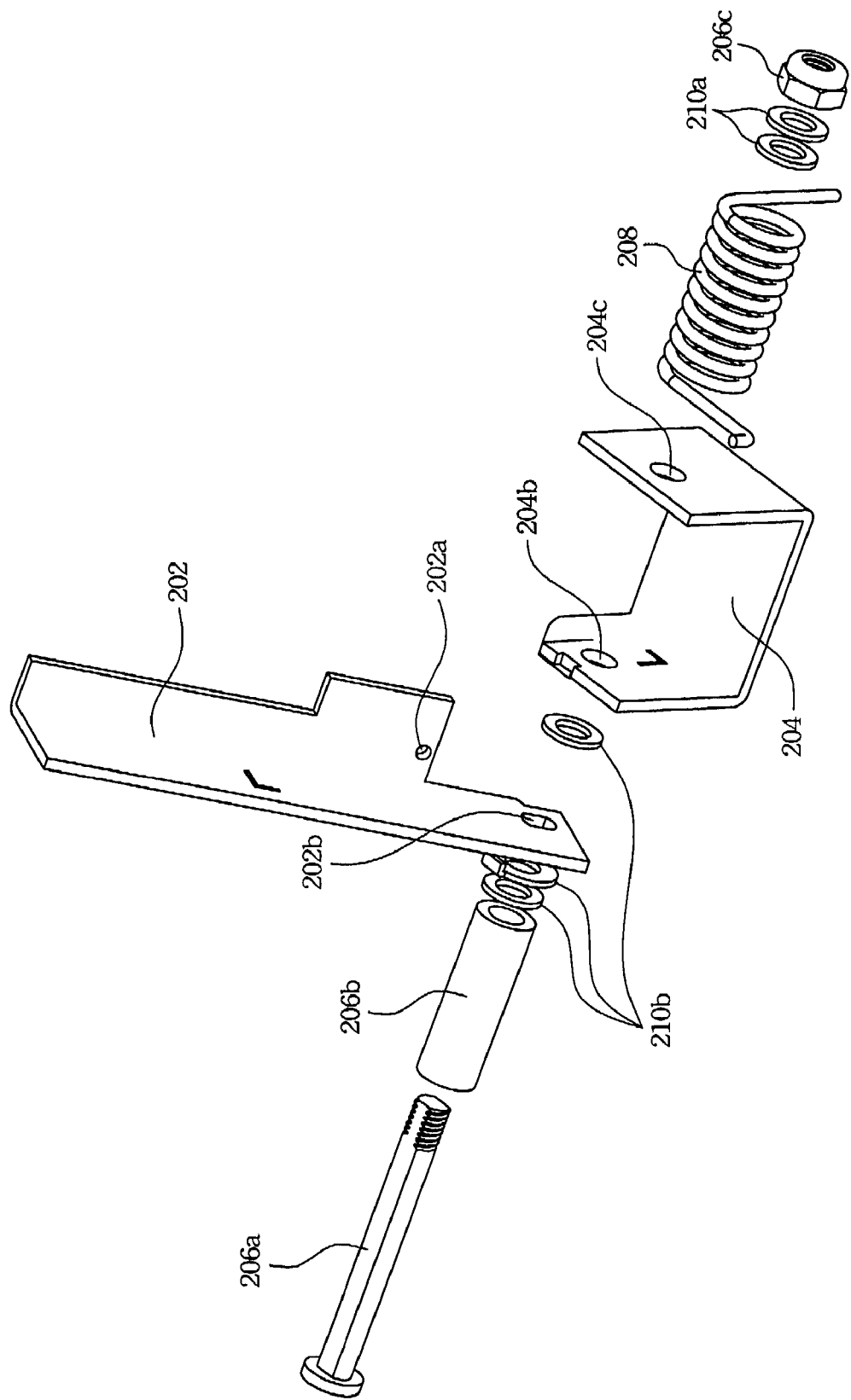
FIG. 3 illustrates an exploded view of a torsion-varying hinge according to one preferred embodiment of this invention.

FIG. 3 illustrates an exploded view of a torsion-varying hinge according to one preferred embodiment of this invention. All components in FIG. 3 would be assembled as the hinge 200 in FIG. 2. Aligning the swiveled part 202 (its hole 202b), all washers 210b (their through holes) and a hollow cylinder 206b (its void space) to holes 204b and 204c of the fixed part 204 such that the bolt 206a can be inserted through the holes and void space. Specifically, washers 210b should be placed at two sides of the hole 204b and over the bolt 206a, and washers 210a should be placed at two sides of the hole 204c and over the bolt 206a. The torsion part 208 is disposed around the hollow cylinder 206b, and the hollow cylinder 206b is positioned between the bolt 206a and the torsion part 208, to prevent them from interfering with each other. A nut 206c is screwed on the bolt 206a after all other components are aligned and positioned.

Washers 210b, which are placed at two sides of the hole 204b and in contact with the swiveled part 202, provide torsion to temporarily secure the swiveled part 202 while swiveling at any position or angle. The washers 210b are made of resilient metal and are preferably in wave-shaped (with concave sections and convex sections) so as to provide an enduring torsion. With the torsion part 208 applying the assisting torsion to the swiveled part, necessary torsion for temporarily securing the swiveled part 202 would be reduced.

According to the preferred embodiments of this invention, a torsion-varying hinge provides the console KVM module with an assisting torsion while unfolding the flat panel display away from the keyboard module and while folding the flat panel display against the keyboard module. Therefore, a smaller force is required to unfold the flat panel display and possible injuries to the user may be avoided. And also a smaller torsion is required for supporting the flat panel display against the gravity while folding the flat panel display, and possible damages to the equipment may be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A console KVM module comprising: a main base; a flat panel display module; and a hinge linking the flat panel display module with the main base such that the flat panel display module can fold against or unfold away from the main base, the hinge comprising: a fixed part, secured to the main base; a shaft; a swiveled part, secured to the flat panel display module, the swiveled part pivotally connected with the fixed part by the shaft; a torsion part, disposed around the shaft and engaged in the fixed part and the swiveled part at two ends, wherein the torsion part comprises a spring disposed around the shaft, one end of the spring extending beyond a diameter of the spring and engaging with a hole formed in the swiveled part, wherein the torsion part provides an assisting torsion while folding and unfolding the flat panel display module, wherein the fixed part comprises a U-shaped metal and the torsion part is accommodated by a concave portion of the U-shaped metal; wherein the hinge further comprises a hollow cylinder, positioned between the shaft and the torsion part, to prevent thereof from interfering with each other.

2. The console KVM module of claim 1, wherein the shaft is a bolt.

3. The console KVM module of claim 2, wherein the hinge further comprises a nut, screwed on the bolt so as to fasten the hinge.

4. The console KVM module of claim 1, wherein the assisting torsion cancels at least part of gravitational pull.

5. The console KVM module of claim 1, wherein the hinge further comprises at least one washer placed over the shaft so as to keep the hinge secure.

6. A hinge design for pivotally coupling a main base with a flat panel display module of a console KVM module, the hinge design comprises: a fixed part, secured to the main base; a swiveled part, secured to the flat panel display module; and a torsion part, engaged in the fixed part and the swiveled part at two ends, wherein the torsion part comprises a spring having one end engaged with a hole formed in the swiveled part beyond a diameter of the spring, wherein the torsion part provides an assisting torsion to fold and unfold the flat panel display module and the fixed part comprises a U-shaped metal and the torsion part is accommodated by a concave portion of the U-shaped metal; wherein the hinge further comprises a hollow cylinder, positioned between a shaft and the torsion part, to prevent thereof from interfering with each other.

7. The hinge design of the claim 6, wherein the assisting torsion cancels at least part of gravitational pull.

8. The hinge design of the claim 6, further comprising a shaft, wherein the swiveled part is connected pivotally with the fixed part of the shaft, and the torsion part is disposed around the shaft.

9. The hinge design of the claim 8, further comprising a nut, screwed on the shaft so as to fasten the hinge.

* * * * *